United States Patent
Brandenburg

(10) Patent No.: US 8,550,538 B1
(45) Date of Patent: Oct. 8, 2013

(54) PICKUP TRUCK BED CAMPING TENT WITH AIR MATTRESS

(76) Inventor: Kyle Brandenburg, Edgely, ND (US)

( * ) Notice: Subject to any disclaimer, the term of this patent is extended or adjusted under 35 U.S.C. 154(b) by 0 days.

(21) Appl. No.: 13/442,989

(22) Filed: Apr. 10, 2012

(51) Int. Cl.
*B60P 7/04* (2006.01)

(52) U.S. Cl.
USPC ............................ 296/159; 5/118; 135/88.13

(58) Field of Classification Search
USPC .................. 296/159; 135/88.13; 5/118, 119, 5/706; 52/2.11, 2.17, 2.18
See application file for complete search history.

(56) References Cited

U.S. PATENT DOCUMENTS

| | | |
|---|---|---|
| D285,880 S | 9/1986 | Griesenbeck |
| 5,007,212 A | 4/1991 | Fritts et al. |
| 5,353,826 A | 10/1994 | Davis, Sr. |
| 5,692,795 A | 12/1997 | Mininger |
| 5,893,238 A | 4/1999 | Peacock et al. |
| 6,179,367 B1 | 1/2001 | Bowen |
| 6,179,368 B1 | 1/2001 | Karlsson |
| 6,481,784 B2 | 11/2002 | Cargill |
| 7,021,694 B1 | 4/2006 | Roberts et al. |
| 2008/0169013 A1* | 7/2008 | Brockel et al. ................. 135/93 |
| 2008/0210282 A1 | 9/2008 | Turcot |

* cited by examiner

*Primary Examiner* — Joseph Pape
(74) *Attorney, Agent, or Firm* — Kyle Fletcher

(57) ABSTRACT

The pickup truck bed camping tent with air mattress is an accessory that installs inside of a pickup truck bed, and which deploys to inflate a tent and air mattress in order to provide an enclosure with sleeping surface for at least one person. The inflatable tent and air mattress are inflated via an electric pump, which when operating shall inflate both the tent and mattress from a forward portion of the pickup truck bed forwardly. The inflatable tent is comprised of a plurality of inflatable ribs that attach to a cover that encloses and forms the outer shape of the inflatable tent. The accessory, when inflated, anchors itself to holes located on a top surface of opposing sides of the truck bed, and which requires the tailgate to be in a lowered position.

14 Claims, 6 Drawing Sheets

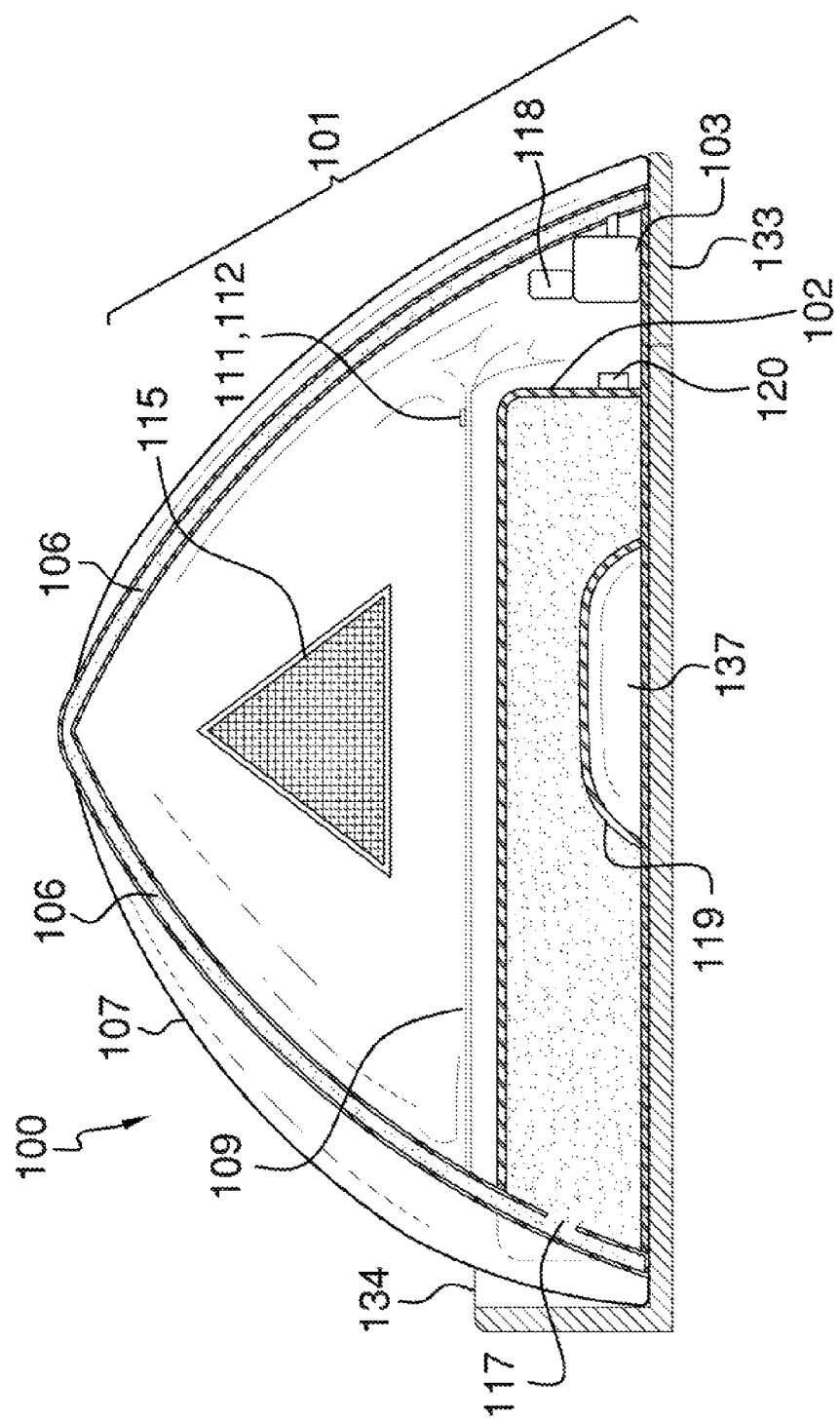

PICKUP TRUCK BED CAMPING TENT WITH AIR MATTRESS

CROSS REFERENCES TO RELATED APPLICATIONS

Not Applicable

STATEMENT REGARDING-FEDERALLY SPONSORED RESEARCH

Not Applicable

REFERENCE TO APPENDIX

Not Applicable

BACKGROUND OF THE INVENTION

A. Field of the Invention

The present invention relates to the field of pickup truck beds, more specifically, a tent and integrated air mattress that is an accessory for use within a pickup truck bed.

B. Discussion of the Prior Art

There is a lot of prior art directed to tents and air mattress that work in conjunction with a pickup truck bed or a rear of a sports utility vehicle or a camper. As will be discussed immediately below, no prior art discloses an accessory that installs at a forward portion of a pickup truck bed, and which includes an inflatable tent and air mattress, which are powered via an electric pump, and that when inflated extend rearwardly to form the structures thereon; wherein the accessory anchors itself to holes provided along a top surface of opposing sides of the truck bed, and requires lowering of the tailgate in order to inflate the inflatable tent; wherein the inflatable tent includes inflatable ribs that inflate to form the support for a cover that encloses and forms the outer shape of the inflatable tent; wherein the cover includes a zippered door that faces the rear of the pickup truck bed, screened windows on various surfaces of the cover, as well as a fan that circulates air inside of the tent; wherein the air mattress may be a single bed or double bed depending on the size of the truck bed.

The Roberts et al. Patent (U.S. Pat. No. 7,021,694) discloses a tent and mattress assembly for a pickup truck that includes a manual air-pump and an electrically-powered air pump. However, the tent does not inflate or include the functions and features of the claimed device at bar.

The Turcot Patent Application Publication (U.S. Pub. No. 2008/0210282) discloses an inflatable tent for mounting onto a pickup truck bed. However, the inflatable tent does not collapse into a storage container formed at a forward portion of the truck bed, and which when inflated includes an air mattress for use within said tent.

The Karlsson Patent (U.S. Pat. No. 6,179,368) discloses a trailer hitch mounted camper. However, the tent is not inflatable, and engaged within a pickup truck bed.

The Mininger Patent (U.S. Pat. No. 5,692,795) discloses a tailgate inflatable tent for a pickup truck bed. However, the tailgate tent does not include the air mattress or operative in the manner of the device at bar.

The Davis, Sr. Patent (U.S. Pat. No. 5,353,826) discloses a tent topper for a pickup truck that includes a plurality of adjustable fastening pins. However, the tent is not inflatable.

The Bowen Patent (U.S. Pat. No. 6,179,367) discloses an inflatable tent for a sport utility vehicle. However, the inflatable tent does not inflate from within and expand to cover the bed of a pickup truck bed, nor inclusive or an air mattress integrated therein.

The Peacock et al. Patent (U.S. Pat. No. 5,893,238) discloses an inflatable tent with inflatable floor chambers that may function as an air mattress. However, the inflatable tent does not work in conjunction with the pickup truck bed.

The Cargill Patent (U.S. Pat. No. 6,481,784) discloses a pickup truck camping system. Again, the system does not include an air mattress and inflatable tent that extend from a forward portion of the pickup truck bed.

The Fritts et al. Patent (U.S. Pat. No. 5,007,212) discloses an inflatable shelter that includes a tubular base frame, tubular support ribs, an inflatable mattress, a zippered door, winds, and air valves for inflation and deflation. Again, the inflatable shelter does not work in conjunction with a pickup truck bed.

While the above-described devices fulfill their respective and particular objects and requirements, they do not describe an accessory that installs at a forward portion of a pickup truck bed, and which includes an inflatable tent and air mattress, which are powered via an electric pump, and that when inflated extend rearwardly to form the structures thereon; wherein the accessory anchors itself to holes provided along a top surface of opposing sides of the truck bed, and requires lowering of the tailgate in order to inflate the inflatable tent; wherein the inflatable tent includes inflatable ribs that inflate to form the support for a cover that encloses and forms the outer shape of the inflatable tent; wherein the cover includes a zippered door that faces the rear of the pickup truck bed, screened windows on various surfaces of the cover, as well as a fan that circulates air inside of the tent; wherein the air mattress may be a single bed or double bed depending on the size of the truck bed. In this regard, the pickup truck bed camping tent with air mattress departs from the conventional concepts and designs of the prior art.

SUMMARY OF THE INVENTION

The pickup truck bed camping tent with air mattress is an accessory that installs inside of a pickup truck bed, and which deploys to inflate a tent and air mattress in order to provide an enclosure with sleeping surface for at least one person. The inflatable tent and air mattress are inflated via an electric pump, which when operating shall inflate both the tent and mattress from a forward portion of the pickup truck bed forwardly. The inflatable tent is comprised of a plurality of inflatable ribs that attach to a cover that encloses and forms the outer shape of the inflatable tent. The accessory, when inflated, anchors itself to holes located on a top surface of opposing sides of the truck bed, and which requires the tailgate to be in a lowered position.

It is an object of the invention to provide an accessory that installs inside of a pickup truck bed, and which can self-inflate to provide a tent and air mattress that encompass said pickup truck bed.

Another object of the invention is to provide an accessory that collapses into a storage shape that is located at a forward portion of the pickup truck bed, and which when inflated, shall extend rearwardly.

Another object of the invention is to include an electric pump that is in fluid communication with the air mattress and inflatable tent such that when operating both the air mattress and inflatable tent shall simultaneously inflate.

An even further object of the invention is to provide an electric pump that is powered via the electrical supply of the corresponding pickup truck, or an auxiliary power source that is portable.

Another object of the invention is to provide an inflatable tent that is constructed of inflatable ribs and a cover that forms the outer shape of the tent, and which anchors to opposing sides of the pickup truck bed.

Another object of the invention is to provide a cover that includes screened openings, a zippered door that faces rearwardly, and a fan that can circulate fresh air inside of the inflatable tent.

These together with additional objects, features and advantages of the pickup truck bed camping tent with air mattress will be readily apparent to those of ordinary skill in the art upon reading the following detailed description of presently preferred, but nonetheless illustrative, embodiments of the pickup truck bed camping tent with air mattress when taken in conjunction with the accompanying drawings.

In this respect, before explaining the current embodiments of the pickup truck bed camping tent with air mattress in detail, it is to be understood that the pickup truck bed camping tent with air mattress is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pickup truck bed camping tent with air mattress.

It is therefore important that the claims be regarded as including such equivalent construction insofar as they do not depart from the spirit and scope of the pickup truck bed camping tent with air mattress. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 4A illustrates a cross-sectional view of the pickup truck bed camping tent with air mattress along line 4-4 in FIG. 3, and detailing the inter-relation of the inflatable ribs and cover forming the inflatable tent as well as the air mattress that extends along the length of the pickup truck bed and lowered tailgate;

DETAILED DESCRIPTION OF THE EMBODIMENT

Figure 1:
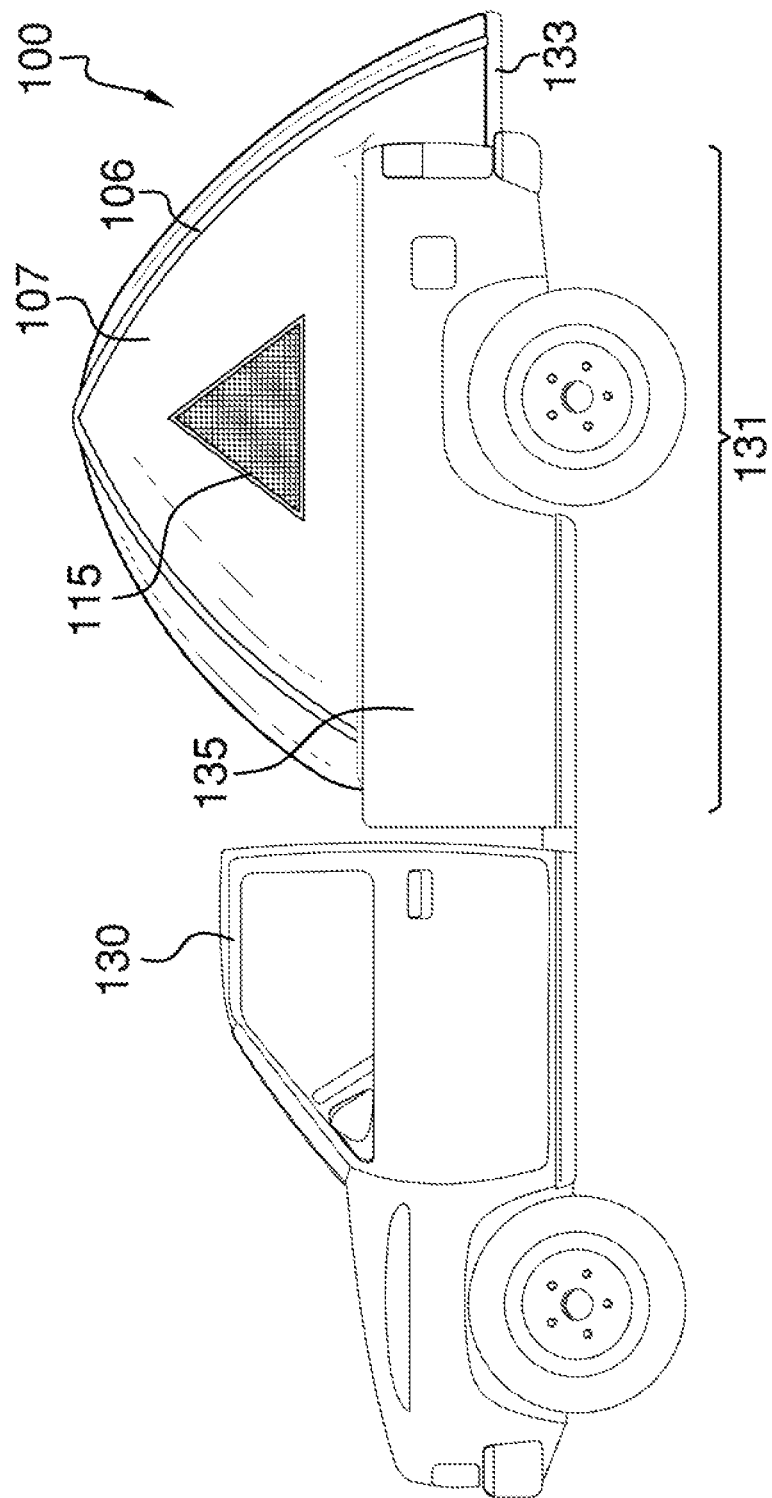
FIG. 1 illustrates a side view of the pickup truck bed camping tent with air mattress fully inflated and attached onto the pickup truck bed having the tailgate at a lowered position.

The following detailed description is merely exemplary in nature and is not intended to limit the described embodiments of the application and uses of the described embodiments. As used herein, the word "exemplary" or "illustrative" means, "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A pickup truck bed camping tent with air mattress 100 (hereinafter invention) includes an inflatable tent 101 and an air mattress 102 that are collectively in fluid communication with an electric pump 103.

The invention 100 can convert from a deflated storage shape 104 (see FIG. 4B) that is located at a forward portion 132 of a pickup truck bed 131 of a pickup truck 130. Moreover, the invention 100 can convert from the deflated storage shape 104 to an in-use shape 105 (see FIG. 4A) wherein a tailgate 133 shall be in a lowered position as a portion of both the inflatable tent 101 and the air mattress 102 shall rest thereon. The deflated storage shape 104 shall resemble a cube that is relatively small in comparison to the overall size of the in-use shape 105 such that when not in use, the invention 100 does not take up a lot of room inside of the pickup truck bed 131.

Figure 3:
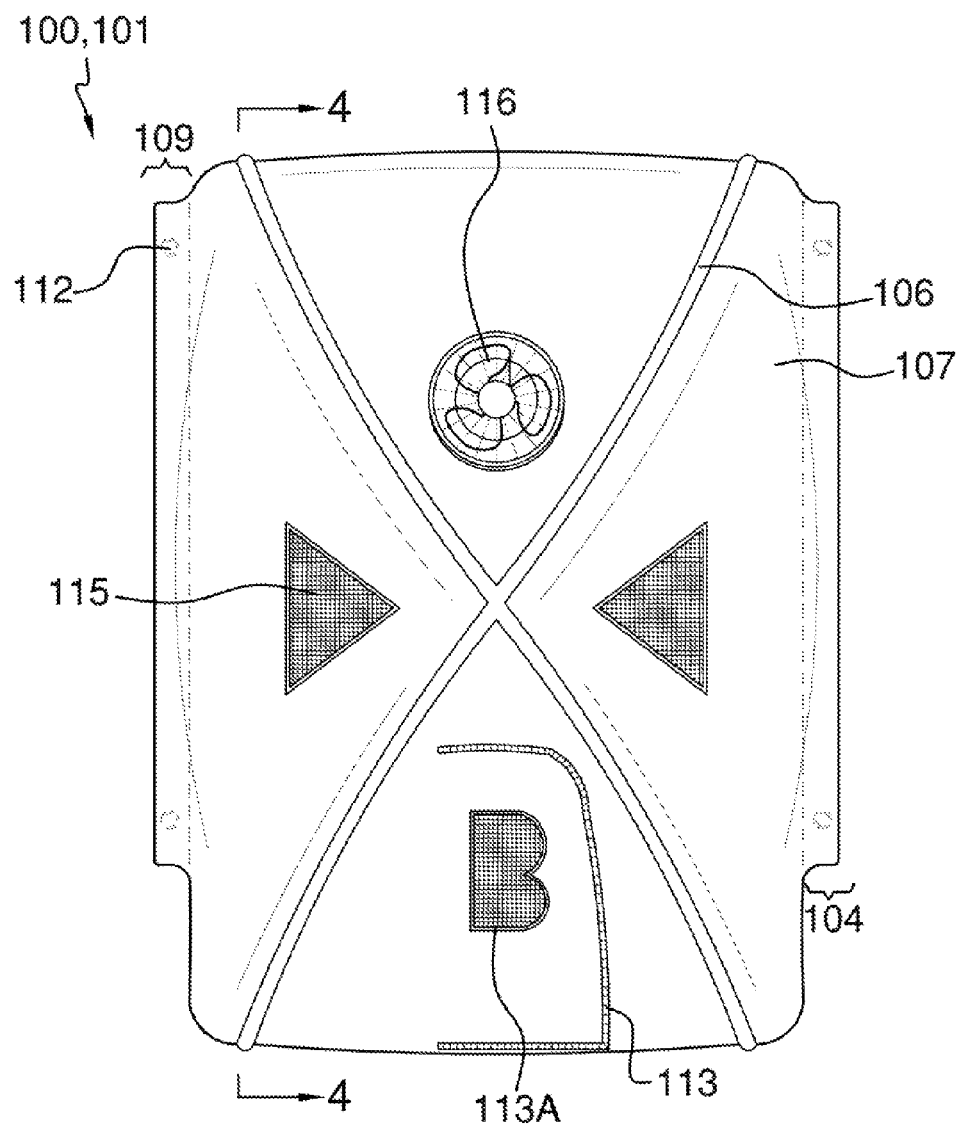
FIG. 3 illustrates a top view of the cover of the inflatable tent, and detailing the zippered door, screened windows, and fan integrated into the construction of the cover.
Figure 4B:
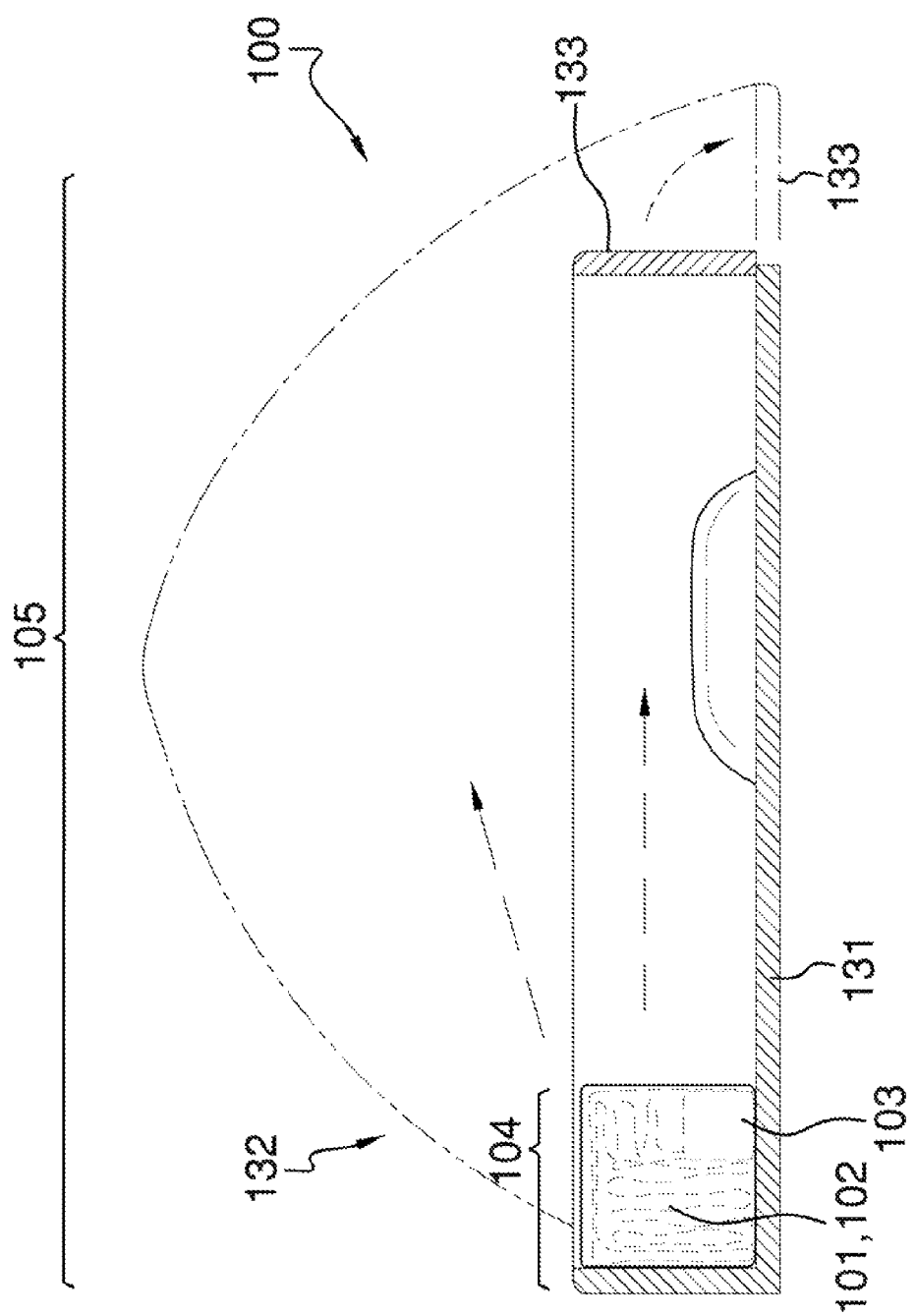
FIG. 4B illustrates another cross-sectional view of the pickup truck bed camping tent with air mattress along line 4-4 in FIG. 3 wherein the entire accessory is deflated and in a storage shape located at a forward end of the pickup truck bed, and which is depicted as inflating to an in-use shape as indicated by the rearwardly directed arrows.
Figure 5:
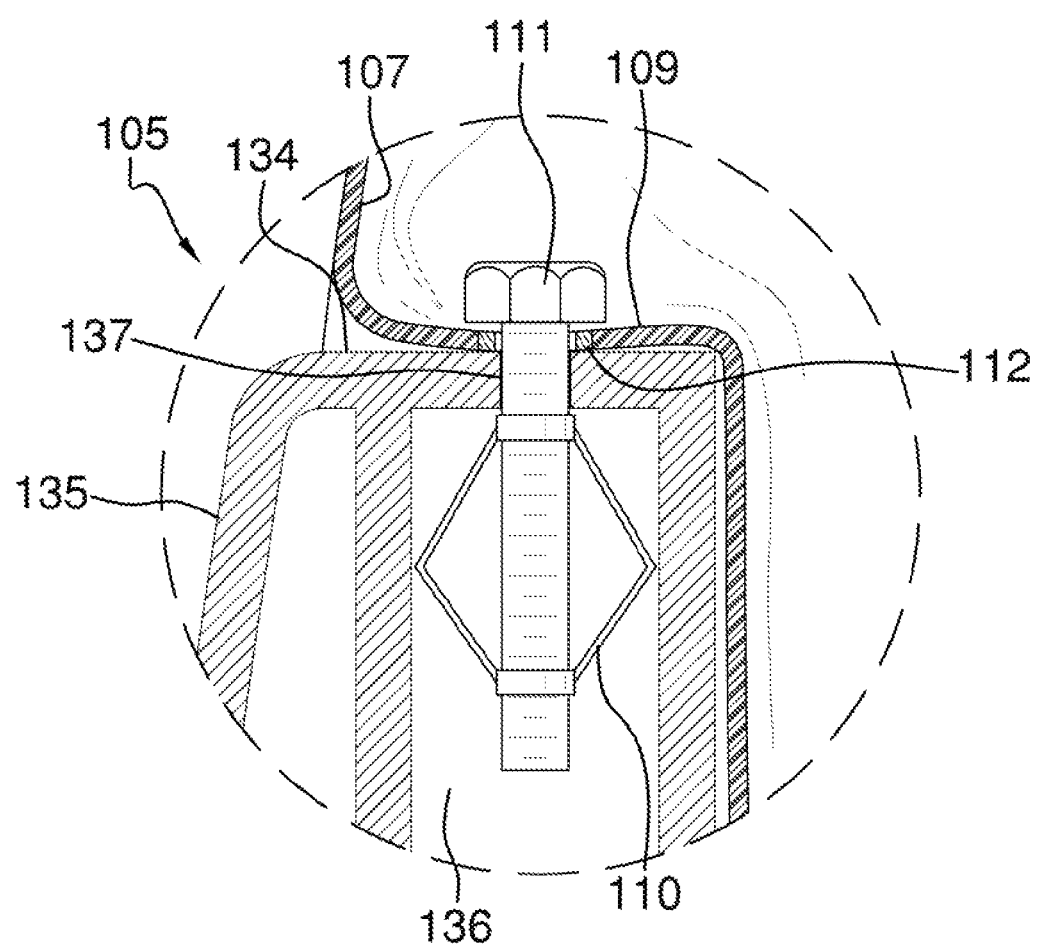
FIG. 5 illustrates a small detail of the anchoring means used along top surfaces of both sides of the pickup truck bed, which secures the accessory to said pickup truck bed.

The inflatable tent 101 is constructed of a plurality of inflatable ribs 106 that criss-crosses one another, and form an arch shape that supports a cover 107 spanning there across. The cover 107 forms the overall shape of the inflatable tent 101, and supplies coverage to the space located there under. The cover 107 is unique in terms of shape and function in that the cover 101 is responsible for securing the invention 100 onto the pickup truck bed 130. Referring to FIGS. 3 and 5, the cover 107 includes anchoring means 108 that are provided at different locations along lipped members 109. The anchoring means 108 are designed to bolt the lipped members 109 of the cover 107 to top surfaces 134 of opposing sides 135 of the pickup truck bed 131.

The anchoring means 108 are comprised of an expansion anchor 110 and bolt 111 that attach to one another in order to secure the invention 100 to the pickup truck bed 131. The expansion anchor 110 fits inside of a cavity 136 located in each of the opposing sides 135 of the pickup truck bed 131. The bolt 111 descends downwardly into holes 137 located on the top surface 134 of the respective opposing side 135. The cover 107 may include a grommet 112 at the exact location where the anchoring means 108 aligns with the hole 137 in order to prevent damage or tearing of the cover 107. That being said, it shall be noted that the cover 107 may be made of a flexible fabric, which is impermeable so as to prevent water from passing through and inside of the inflatable tent 101.

The cover 107 also includes a zippered door 113 that is provided on a rear surface 114, and which is facing rearwardly with respect to the pickup truck 130. The zippered door 113 has a "U" shaped line that is oriented 90 degrees counterclockwise, and which opens via a zipper pull 113' in order to provide ingress and egress with respect to the interior space of the inflatable tent 101. The zippered door 113 may further include a screened opening 113A within the layout.

The cover 107 also includes at least one screened window 115 that is located at various other surfaces of the cover 107, and which enables fresh air to pass in or out of the interior of the inflatable tent 101. The cover 107 may also include a fan 116, which when operating shall move fresh air in or out of the interior space of the inflatable tent 101. The fan 116 is ideally of lightweight and small construction, and may be powered via at least one battery provided in the construction of the fan 116. The overall weight of the fan 116 shall be determined according to the available weight load on the inflatable tent 101.

The air mattress 102 may be a permanent interior fixture of the inflatable tent 101. Moreover, both the air mattress 102 and the inflatable tent 101 are in fluid communication with the electric pump 103. The electric pump 103 is provided at a rearmost interior space of the inflatable tent 101, and when operating shall inflate both the inflatable tent 101 and the air mattress 102 simultaneously. Thus, the air mattress 102 is in fluid communication with the inflatable tent 101 via at least one air inlet 117 (see FIG. 4A). Also, it shall be noted that the electric pump 103 is either powered via a portable powering means 118 or is in wired communication with a vehicle power supply, such as the battery of the pickup truck 130.

The air mattress 102 may include contoured surfaces 119 that align with wheel wells 137 of the pickup truck bed 131 such that when the invention 100 is fully inflated that air mattress 102 snuggly fits and contours to the overall interior of the pickup truck bed 131.

It shall be further noted that the electric pump 103 may be the sole source for deflation of the invention 100. However, a screw-cap plug 120 may be included on either the air mattress 102 or on at least one of the inflatable ribs 106, and provide the necessary means to deflate the invention 100.

Figure 2:
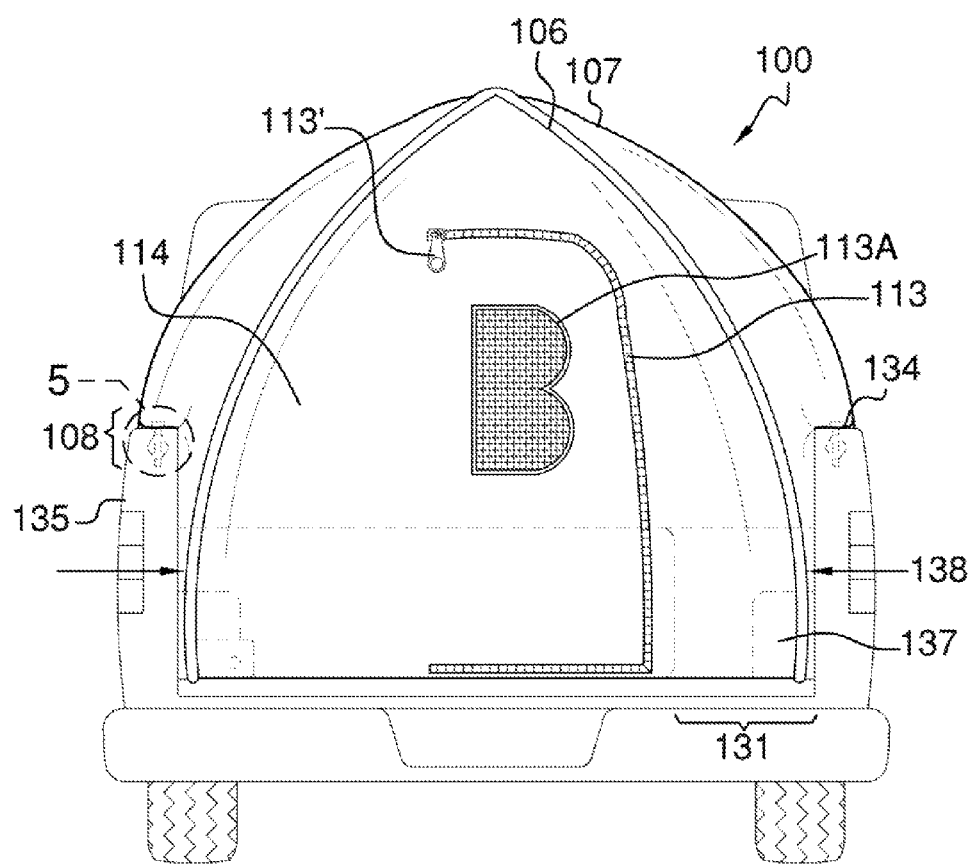
FIG. 2 illustrates a rear view of the pickup truck bed camping tent with air mattress in which the zippered door is provided on a rear surface of the cover so as to provide ingress and egress with respect to the inflatable tent.

Referring to FIG. 2, the air mattress may encompass the full width 138 of the pickup truck bed 131, which may be analogous to a double. Moreover, the air mattress 102 may be a single sized bed, and in which case shall leave an open side 121 along the interior of both the inflatable tent 101 and the pickup truck bed 131.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A pickup truck bed camping tent with air mattress comprising:

an inflatable tent and an air mattress that are each in fluid communication with an electric pump, which converts both the inflatable tent and the air mattress from a deflated storage shape configured and located at a forward portion of said pickup truck bed to an in-use shape that occupies both said pickup truck bed and adaptively used in connection with a tailgate in a lowered position;

wherein the inflatable tent includes a plurality of inflatable ribs and a cover that encloses an interior space, and forms the overall shape of the inflatable tent, and which contains the air mattress within said interior space of the inflatable tent;

wherein the cover includes lipped members on opposing sides;

anchoring means are located at different locations along the lipped members; wherein the lipped members are configured to rest atop of a top surface of opposing sides of the pickup truck bed, and which enable the anchoring means to secure the inflatable tent and air mattress to the pickup truck bed;

wherein the anchoring means include an expansion anchor and bolt that attach to one another in order to secure the lipped members to the top surface of the opposing sides of the pickup truck bed;

wherein the expansion anchor fits inside of a cavity located in each of the opposing sides of the pickup truck bed; wherein the bolt descends downwardly into a corresponding hole located on the top surface of the respective opposing side.

2. The pickup truck bed camping tent with air mattress as described in claim 1 wherein the inflatable ribs criss-cross one another to form an arch shape that supports the cover thereon.

3. The pickup truck bed camping tent with air mattress as described in claim 1 wherein the cover includes a zippered door that is provided on a rear surface of said cover, and which is facing rearwardly with respect to the pickup truck.

4. The pickup truck bed camping tent with air mattress as described in claim 3 wherein the zippered door has a "U" shaped line that is oriented 90 degrees counterclockwise, and which opens via a zipper pull in order to provide ingress and egress with respect to an interior space of the inflatable tent.

5. The pickup truck bed camping tent with air mattress as described in claim 4 wherein the cover includes at least one screened window.

6. The pickup truck bed camping tent with air mattress as described in claim 4 wherein the cover includes a fan that when operative moves fresh air in and out of the inflatable tent.

7. The pickup truck bed camping tent with air mattress as described in claim 1 wherein the electric pump is located at a rearmost interior space of the inflatable tent, and when in use shall produce compressed air, which inflates both the inflatable tent and the air mattress simultaneously.

8. The pickup truck bed camping tent with air mattress as described in claim 7 wherein the air mattress is in fluid communication with the inflatable tent via at least one air inlet; wherein the air mattress includes at least one contoured surface that aligns with wheel wells of the pickup truck bed such that when the air mattress is fully inflated, the air mattress fits against the respective wheel well.

9. A pickup truck bed camping tent with air mattress comprising:

an inflatable tent and an air mattress that are each in fluid communication with an electric pump, which converts both the inflatable tent and the air mattress from a deflated storage shape configured and located at a forward portion of said pickup truck bed to an in-use shape that occupies both said pickup truck bed and adaptively used in connection with a tailgate in a lowered position;

wherein the inflatable ribs criss-crosses one another to form an arch shape that supports the cover thereon;

wherein the inflatable tent includes a plurality of inflatable ribs and a cover that encloses an interior space, and forms the overall shape of the inflatable tent, and which contains the air mattress within said interior space of the inflatable tent;

wherein the cover includes lipped members on opposing sides;

anchoring means are located at different locations along the lipped members; wherein the lipped members are configured to rest atop of a top surface of opposing sides of the pickup truck bed, and which enable the anchoring means to secure the inflatable tent and air mattress to the pickup truck bed;

wherein the anchoring means include an expansion anchor and bolt that attach to one another in order to secure the lipped members to the top surface of the opposing sides of the pickup truck bed; wherein the expansion anchor fits inside of a cavity located in each of the opposing sides of the pickup truck bed; wherein the bolt descends downwardly into a corresponding hole located on the top surface of the respective opposing side.

10. The pickup truck bed camping tent with air mattress as described in claim 9 wherein the cover includes a zippered door that is provided on a rear surface of said cover, and which is facing rearwardly with respect to the pickup truck; wherein the zippered door has a "U" shaped line that is oriented 90 degrees counterclockwise, and which opens via a zipper pull in order to provide ingress and egress with respect to an interior space of the inflatable tent.

11. The pickup truck bed camping tent with air mattress as described in claim 10 wherein the cover includes at least one screened window.

12. The pickup truck bed camping tent with air mattress as described in claim 11 wherein the cover includes a fan that when operative moves fresh air in and out of the inflatable tent.

13. The pickup truck bed camping tent with air mattress as described in claim 9 wherein the electric pump is located at a rearmost interior space of the inflatable tent, and when in use shall produce compressed air, which inflates both the inflatable tent and the air mattress simultaneously; wherein the air mattress encompass either a full width of the pickup truck bed or is a single sized bed, and in which case shall leaves an open side along the interior of both the inflatable tent and the pickup truck bed.

14. The pickup truck bed camping tent with air mattress as described in claim 13 wherein the air mattress is in fluid communication with the inflatable tent via at least one air inlet; wherein the air mattress includes at least one contoured surface that align with wheel wells of the pickup truck bed such that when fully inflated the air mattress fits against the respective wheel well; wherein the inflatable tent and air mattress are deflated by use of either the electric pump operating in reverse or a screw-cap plug located on either the air mattress or inflatable ribs.

* * * * *